United States Patent
Yamaguchi et al.

(10) Patent No.: US 6,813,100 B2
(45) Date of Patent: Nov. 2, 2004

(54) MINIATURE IMAGE-CAPTURING LENS, IMAGE-CAPTURING UNIT AND MOBILE TERMINAL PROVIDED THEREWITH

(75) Inventors: Susumu Yamaguchi, Hachioji (JP); Masae Sato, Machida (JP); Takumi Matsui, Hachioji (JP)

(73) Assignee: Konica Corporation, Tokyo (JP)

( * ) Notice: Subject to any disclaimer, the term of this patent is extended or adjusted under 35 U.S.C. 154(b) by 20 days.

(21) Appl. No.: 10/411,153

(22) Filed: Apr. 11, 2003

(65) Prior Publication Data

US 2003/0197953 A1 Oct. 23, 2003

(30) Foreign Application Priority Data

Apr. 16, 2002 (JP) ........................ 2002-113145

(51) Int. Cl.[7] .............. G02B 9/04; G02B 9/06; G02B 15/14
(52) U.S. Cl. ............ 359/793; 359/794; 359/795; 359/691; 359/717
(58) Field of Search ............... 359/793, 794, 359/795, 691, 738, 739, 646, 717

(56) References Cited

U.S. PATENT DOCUMENTS 3,511,558 A  5/1970  Uberhagen
5,467,225 A * 11/1995  Manabe .................. 359/661
5,739,965 A   4/1998  Ohno
6,650,485 B2 * 11/2003  Shinohara ............... 359/717

FOREIGN PATENT DOCUMENTS

DE    31 19 498 A1    12/1982
WO    WO 98/23988     6/1998

* cited by examiner

Primary Examiner—Tim Thompson
(74) Attorney, Agent, or Firm—Finnegan, Henderson, Farabow, Garrett & Dunner, L.L.P.

(57) ABSTRACT

A miniature image capturing lens includes an aperture diaphragm; and a lens system consisting of a first lens having a positive refracting power in which a convex surface of the first lens is directed toward an image; and a meniscus-shaped second lens in which a concave surface of the meniscus is directed toward an object. The aperture diaphragm, the first lens and the second lens are aligned in this order from the object side, the fist and second lenses have at least one aspherical surface. The following conditional formulas are satisfied:

$$0.50 < f1/f < 0.80$$

$$0.30 < (R2+R1)/(R1-R2) < 1.20$$

where f1 is a focal length of the first lens, f is a focal length of the entire image capturing lens, R1 is a radius of curvature of the object side surface of the first lens, and R2 is a radius of curvature of the image side surface of the second lens.

7 Claims, 14 Drawing Sheets

COMA (M)

COMA (M)

FIG. 14 (a)
FIG. 14 (b)
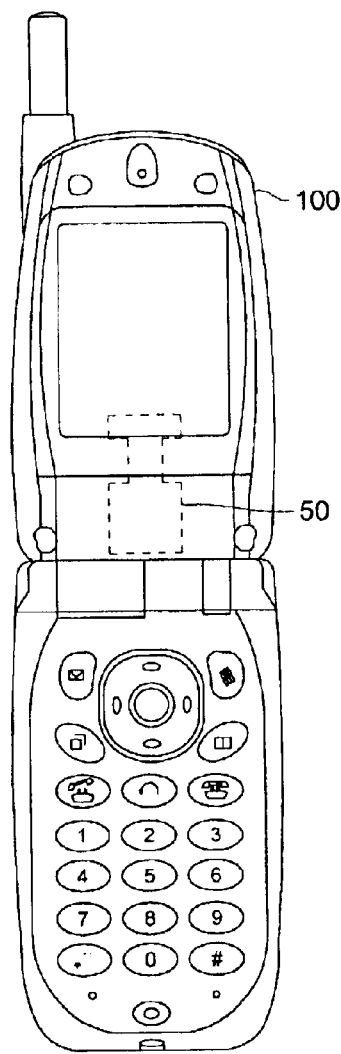
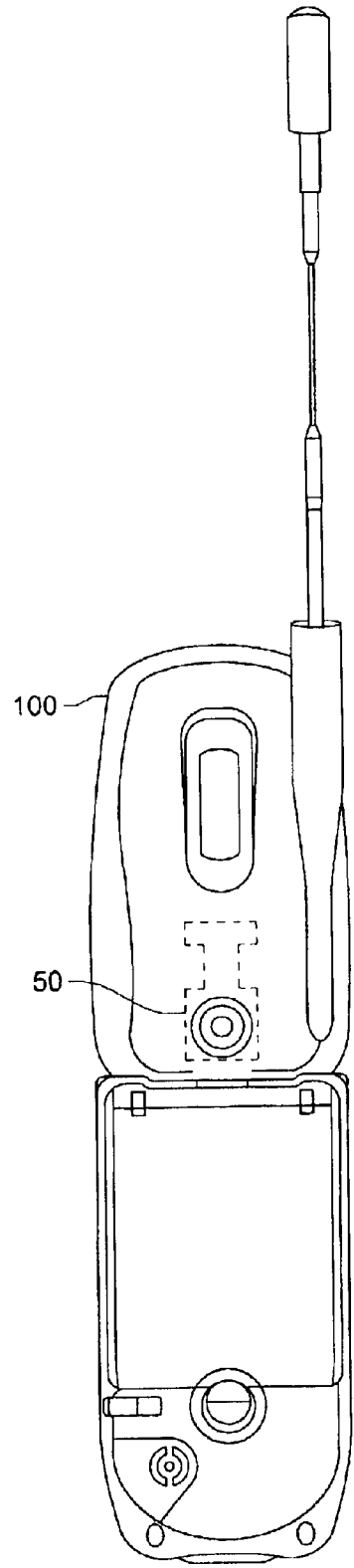

MINIATURE IMAGE-CAPTURING LENS, IMAGE-CAPTURING UNIT AND MOBILE TERMINAL PROVIDED THEREWITH

BACKGROUND OF THE INVENTION

The present invention relates to a miniature image-capturing lens which is suitable for an imaging device employing a solid-state image-capturing element such as a CCD type image sensor, a CMOS type image sensor and the like.

In recent years, due to the higher performance demands and miniaturization of imaging devices employing solid-state image-capturing elements such as a CCD (a charged coupled device) type image sensor, a CMOS (a complementary metal oxide semiconductor) type image sensor and the like, mobile phones or personal computers employing such imaging devices have become popular. Further, continual miniaturization of image-capturing lenses loaded on the imaging devices is further demanded.

A two-piece structured lens, which makes it possible to develop higher performance compared to a single lens, is suitable for the image-capturing lens for the above-mentioned usage. Well known is a retro-focus type image-capturing lens, composed of a first lens having a negative refractive power, a diaphragm, and a second lens having a positive refractive power, which are arranged in the order from the object side. The image-capturing lens composed as mentioned above is disclosed in TOKKAI 2000-321489 and TOKKAI 2001-183578.

Though an image-capturing lens of this type is suitable for a wide angle function, its back-focus is apt to be long, which makes it very difficult to have a total image-capturing lens length (a distance from a surface located closest the object side in the entire image-capturing lens to an image-side focal point, provided that in the image-capturing lens in which the aperture diaphragm is located closest to the object side, the total length of the image-capturing lens is a distance from the aperture diaphragm to the image side focal point) to be short.

SUMMARY OF THE INVENTION

The present invention has been attained in view of the above-mentioned problems. The object of the invention is to provide a miniature image-capturing lens which is smaller and is optimally corrected for aberration, though it simply consists of two separate lenses.

Concerning the size of the miniature image-capturing lens, the present invention aims at the miniaturization of the image-capturing lens to a level satisfying the following formula. By satisfying this limit, the total length of the image-capturing lens is shortened, and its external diameter is synergistically shortened. Therefore, the imaging device can be totally miniaturized and light in weight.

$$L/2Y<1.50 \qquad \text{Formula (5)}$$

Where,

L: distance on an optical axis between the aperture stop and the image side focal point, and 2Y: diagonal length of an effective image area.

Image side focal point means the image point where parallel incident rays, parallel to the optical axis of the lens, are brought to focus. Further, when a plane-parallel plate is arranged between the image side surface of the image-capturing lens and the focal point, the thickness of the plane-parallel plate is treated as an air-converted distance. Here, in the case as one example that the parallel plate section has a low pass filter, the air-converted distance $D_c$ is obtained by the following formula: $D_c = t/n$, where t is a thickness of the low-pass filter and n is the refractive index of the low-pass filter.

Item 1

A miniature image-capturing lens is composed of:

an aperture stop, a first lens, having a positive refractive power, whose convex surface faces to the image side, and a second lens, formed to be a meniscus shape, whose concave surface faces to the object side, and all of which are arranged in the above order from the object side, wherein the first lens and the second lens each have at least an aspheric surface, and the following formulas are satisfied:

$$0.50 < f1/f < 0.80 \qquad \text{Formula (1)}$$

$$0.30 < (R2+R1)/(R1-R2) < 1.20 \qquad \text{Formula (2)}$$

where f1: the focal length of the first lens, f: the focal length of the total image-capturing lens, R1: the radius of curvature of the object side surface of the first lens, R2: the radius of curvature of the image side surface of the first lens.

In order to obtain the miniature image-capturing lens whose aberrations are optimally corrected, the fundamental construction of the present invention is composed of an aperture stop arranged in a total image-capturing lens system at the side nearest to the object, the positive lens with the convex surface facing the image side having a larger refractive power than the object side surface, and the second lens of a meniscus shape facing its concave surface to the object side.

By arranging the aperture stop in the image-capturing lens system at the nearest side to the object, and by having the larger positive refractive power on the image side surface of the first lens, it is possible to keep an exit pupil at a further distance from the image surface. With this arrangement, main light rays of a light flux emitted from a lens final surface becomes to be incident with an angles near perpendicular onto a solid-state image-capturing element. That is, a image side telecentric characteristic necessary for an image-capturing lens used for the solid-state image-capturing element can be secured well and a shading phenomena on a peripheral section of an image screen can be reduced. Therefore, it becomes possible to obtain a structure by which an image side telecentric characteristic is easily secured, which is necessary for miniature image-capturing lens employed in solid-state image-capturing elements. Further, by having such large negative refractive power on the object side surface of the second lens, it becomes possible to correct for any aberration.

Still further, by featuring at least one aspheric surface on each the first lens and second lens, it is possible to correct for aberration optimally. By featuring an aspheric surface on the first lens having the positive power, spherical aberration and coma are effectively corrected for. On the other hand, since the second lens is arranged nearest to the image side away from the aperture stop, there is a difference between the passing height of light flux on the axis and the passing height of light flux off the axis on the periphery area of the picture surface, and by using the aspheric surface, aberration on the peripheral area of the picture surface such as field curvature and distortion, can be optimally corrected for.

Explanation of Formula (1)

Formula (1) shows the conditions by which the refractive power of the first lens is appropriately determined. If the value of f1/f is greater than the lower limit, the refractive power of the first lens can be controlled within the required level, therefore high ordered spherical aberration, coma, and chromatic aberration of magnification are controlled to be lower, which occur on the image side surface of the first lens. If the value of f1/f is less than the upper limit, the positive refractive power of the first lens is moderately secured, and the total length of the image-capturing lens can be shortened.

Explanation of Formula (2)

Formula (2) shows the condition by which a shape factor of the first lens can be appropriately established under the condition of formula (1). If the value of (R2+R1)/(R1−R2) is greater than the lower limit, the image side surface serves mainly as the positive refractive power of the first lens, therefore the image side telecentric characteristic of the total image-capturing lens system is easily obtained. Further, if the above-mentioned value is less than the upper limit, the radius of curvature of the image side surface of the first lens does not become excessively small, and the back focus of the total image-capturing lens system is easily obtained. Therefore it is preferable from the point of view of manufacture of the first lens. It is more preferable to satisfy the following formula (2').

$$0.40<(R2+R1)/(R1-R2)<0.90 \qquad \text{Formula (2')}$$

Item 2

The miniature image-capturing lens is characterized by satisfying the following formula.

$$-0.50<R3/((N2-1)\cdot f)<-0.10 \qquad \text{Formula (3)}$$

where,

R3: the radius of curvature of the object side surface of the second lens,

N2: refractive index of the second lens for d line light, and f: focal length of the total image-capturing lens.

Explanation of Formula (3)

Formula (3) shows the condition by which the field curvature is easily corrected and the image surface is made flattened, by establishing the negative refractive power of the object side surface of the second lens. The focal length of the object side surface of the second lens is calculated by R3/(N2−1) with radius of curvature (R3) and refractive index (N2), therefore formula (3) shows the ratio of the focal length of the object side surface of the second lens to the focal length of the total image-capturing lens.

If the value of R3/((N2−1)·f) is greater than the lower limit of Formula (3), the negative refractive power of the object side surface of the second lens can be controlled within the required level, therefore coma flare of the off-axial light flux and pin-cushion distortion can be controlled not to occur, and an excellent quality image can be produced. If the above-mentioned value is less than the upper limit, the negative refractive power of the object side surface of the second lens is secured, and therefore, the positive Petzval sum decreases, which allows for easy correction of field curvature. Still further, chromatic aberration of magnification, which occurs on the image side surface of the first lens, can be optimally corrected. It is more desirable to satisfy the following formula.

$$-0.40<R3/((N2-1)\cdot f)<-0.20 \qquad \text{Formula (3')}$$

Item 3

The miniature image-capturing lens is characterized by satisfying the following formula.

$$25.0<v1-v2 \qquad \text{Formula (4)}$$

where, v1: the Abbe number of the first lens, and v2: the Abbe number of the second lens.

Explanation of Formula (4)

Formula (4) shows the condition by which chromatic aberration of the first lens of a positive power and that of the second lens of a negative power are corrected. If the value of v1−v2 is greater than the lower limit, axial chromatic aberration and chromatic aberration of magnification can be corrected and balanced well.

Item 4

Miniature image-capturing lenses are characterized in that the first lens and the second lens are formed of a plastic material. Here, the description that the lens is formed by a plastic material includes the case that the plastic material is used as a basic material and a coating process is conducted for the surface of the base material for the purpose of the reflection prevention and the surface hardness enhancement.

In recent years, since the miniaturization of the total imaging device is aimed for the objective, developed are image-capturing elements aligned at a smaller pitch, when compared to image-capturing elements having an identical number of the picture elements, that is, developed are the solid-state image-capturing element featuring a light receiving section (a photoelectric conversion section) whose picture surface is smaller. Concerning the image-capturing lens used for solid-state image-capturing elements having smaller picture surface, in order to secure identical image angle, the focal length of the total system must be short, and thereby, the radiuses of the curvature of the each lens and their external diameters can become extremely small. It is very difficult to produce such glasses lens by typical polishing. However, if the above-mentioned first lens and second lens are composed of plastic which can be produced by injection molding, it is possible to perform mass production, even though image-capturing lenses have a very small radius of curvature and a very small diameter. Further, it is relatively easy to make an aspheric surface, to correct for aberration. Glass-molded lenses can also be considered as image-capturing lenses which can be easily produced, though the diameter is too small. However, there is a problem of durability in the metal mold die using the present technology, and therefore, plastic lenses are more suitable for mass production, by which product cost can be limited.

Item 5

Miniature image-capturing lenses are characterized in that the first and second lenses are formed of plastic material whose saturated water-absorption ratio is not greater than 0.7%.

The saturated water-absorption ratio of the plastic lenses is greater than that of glass lenses. When the humidity changes rapidly, abnormal distribution of water absorption occurs in the plastic lenses, causing the refractive index to not be uniform, resulting in a tendency for excellent focusing performance to be lost. Accordingly, by using plastic material whose saturated water-absorption ratio is not greater than 0.7% for the first and second lenses, it is possible to control such deterioration of the performance of the miniature image-capturing lens, caused by temperature change.

Item 6

An image capturing unit is characterized in that the image capturing unit comprises:

a solid-state image capturing element provided with a photo-electrically converting section;

the image capturing lens described in Items 1 to 5 and to form an image of an object on the photo-electrically converting section of the solid-state image capturing element;

a base board to support the solid-state image capturing element and having a terminal for an external connection to transmit and receive electric signals; and a casing made of light shielding member and having an opening section for incident light coming from the object, wherein the solid-state image capturing element, the image capturing lens, the base board and the casing are constructed in a single body and the height of the image capturing unit in the direction of an optical axis of the image capturing lens is 10 mm or less.

By using the image capturing lens described in Items 1 to 5, it becomes possible to obtain the image capturing unit having an advantage capable of being made in miniature and realizing high quality image. Here, "opening section for incident light coming from the object" is not necessarily limited to an opening to form a space such a hole and may means a section in which a region to allow the incident light coming from the object to transmit is formed.

The description "the height of the image capturing unit in the direction of an optical axis of the image capturing lens is 10 mm or less" means a total length of an image capturing unit provided with all the above structures in the direction of the optical axis. Therefore, for example, in the case that the casing is mounted on the obverse side of the base board and electronic components are mounted on the back side of the base board, it is supposed that a distance from a tip end of the casing at the object side to a tip end of an electronic component protruded form the back side is 10 mm or less.

Item 7

A mobile terminal is characterized by being provided with the image capturing unit described in Item 6.

By providing the image capturing unit described in Item 6 on the mobile terminal, it becomes possible to obtain the mobile terminal capable of being made in miniature and capturing a high quality image.

BRIEF DESCRIPTION OF THE DRAWINGS

FIGS. 14(*a*) and 14(*b*) each is an external view of an mobile phone.

DETAILED DESCRIPTION OF THE PREFERRED EMBODIMENT

Figure 1:
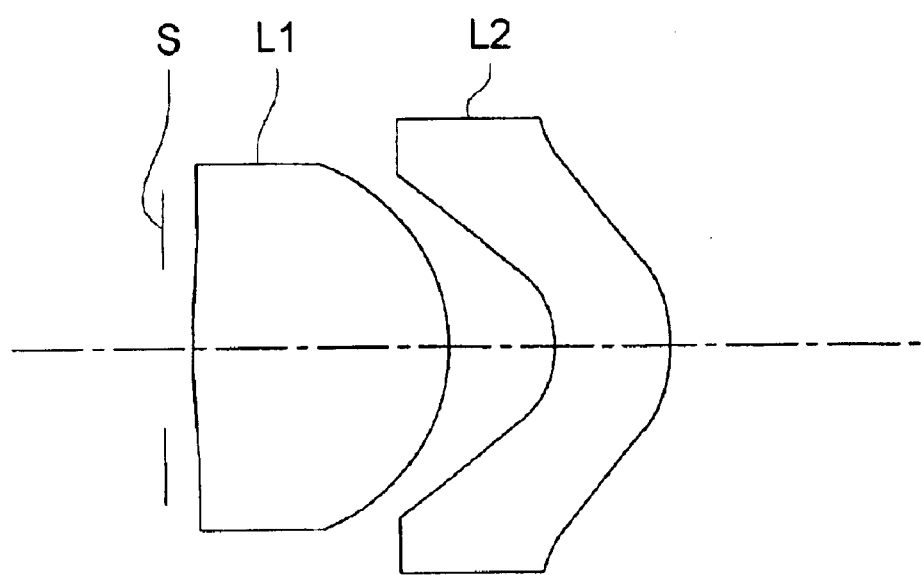
FIG. 1 is a cross section of a miniature image-capturing lens of Examples 1 to 6 of the present invention.

The examples of the miniature image-capturing lens of the present invention will be described referring to the drawings below, but the invention is not limited to this. Following are symbols used in each embodiment.

f: focal length of total image-capturing lens system fB: back-focus

F: F number

2Y: length of diagonals of an effective image area

R: radius of curvature

D: distance between surfaces on the optical axis

Nd: refractive index of image-capturing lens material for the d line v: Abbe's number of image-capturing lens material In each example, the shape of the aspheric surface is shown by expression 1, in a perpendicular coordinate system, with the vertex of the surface being the origin, and the optical axial direction being the x-axis, Expression 1

$$X = \frac{Ch^2}{1+\sqrt{1-(1+K)C^2h^2}} + \sum A_i h^i$$

where, $$h = \sqrt{Y^2 + Z^2}$$

C: vertex curvature,

K: Conic constant, and $A_i$: i-th order aspherical coefficients.

FIG. 1 is a cross section of the miniature image-capturing lens of Examples 1 to 6 of the present invention, in which L1 is the first lens, L2 is the second lens, and S is an aperture diaphragm.

EXAMPLE 1

Tables 1 and 2 show lens data of Example 1. L/2Y equals 1.21 in the present example. In the lens data shown below, "E" shows powers of 10, that is, 2.5×E-03 means $2.5 \times 10^{-3}$.

TABLE 1

(Example 1)
f = 3.330 mm fB = 1.828 mm F = 2.88 2Y = 4.48 mm

| surface No. | R (mm) | D (mm) | Nd | νd |
|---|---|---|---|---|
| diaphragm | ∞ | 0.20 | | |
| 1 | 5.535 | 1.80 | 1.53040 | 56.0 |
| 2 | −1.244 | 0.76 | | |
| 3 | −0.596 | 0.84 | 1.58300 | 30.0 |
| 4 | −0.937 | | | |

TABLE 2

| surface No. | aspherical coefficient |
|---|---|
| 1st surface | K = 1.3914 × E+01<br>A4 = −4.5066 × E−02<br>A6 = −1.8455 × E−01<br>A8 = 5.2288 × E−01<br>A10 = −1.1091 × E+00<br>A12 = 5.9917 × E−01 |
| 2nd surface | K = −1.8910 × E−01<br>A4 = 1.6350 × E−02<br>A6 = −6.6837 × E−03<br>A8 = −6.5469 × E−03<br>A10 = 1.0152 × E−02<br>A12 = −3.5563 × E−03 |
| 3rd surface | K = −1.0951<br>A4 = −1.0713 × E−01<br>A6 = 9.0885 × E−02<br>A8 = 3.7602 × E−02<br>A10 = −1.5720 × E−02<br>A12 = −7.4732 × E−03 |
| 4th surface | K = −1.0922<br>A4 = −1.7190 × E−03<br>A6 = 1.4672 × E−02<br>A8 = 5.4838 × E−03<br>A10 = 1.7923 × E−03<br>A12 = −1.1065 × E−03 |

Figure 2:
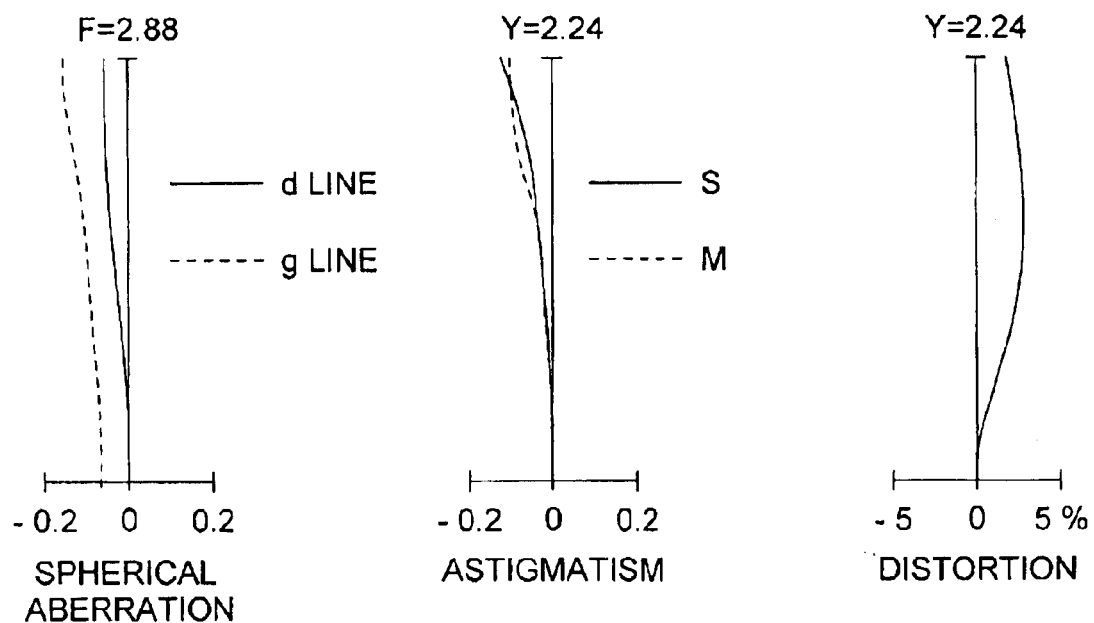
FIG. 2 shows aberrations of a miniature image-capturing lens of Example 1.
Figure 2:
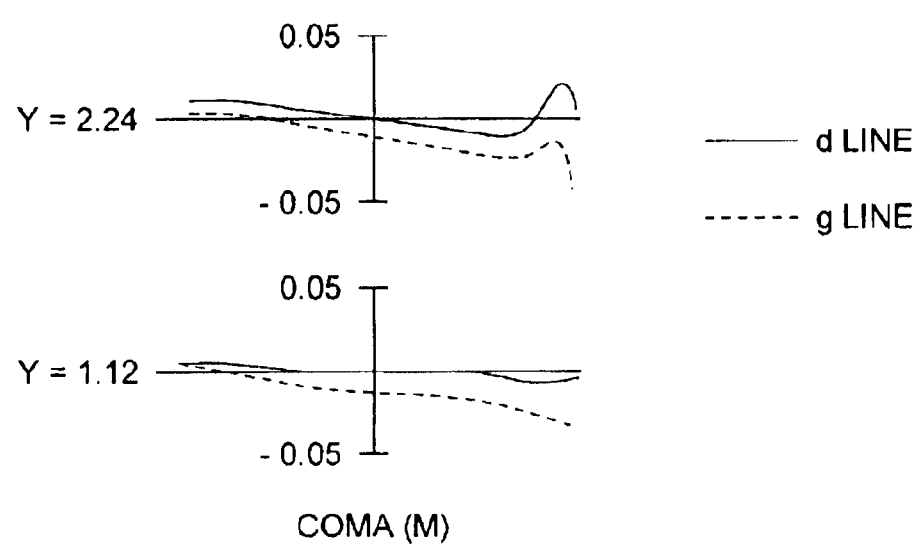

FIG. 2 is a drawing of aberrations (spherical aberration, astigmatism aberration, distortion aberration, and meridional coma aberration) of the miniature image-capturing lens of Example 1. In the present example, the first lens is formed of polyolefine type plastic material, the saturated water-absorption ratio of which is not greater than 0.01%. The second lens is formed of polycarbonate plastic material, and the saturated water-absorption ratio of which is 0.4%.

EXAMPLE 2

Lens data of Example 2 is shown in Tables 3 and 4. In this example, L/2Y equals 1.22.

TABLE 3

(Example 2)
f = 3.330 mm fB = 1.946 mm F = 2.88 2Y = 4.48 mm

| surface No. | R (mm) | D (mm) | Nd | νd |
|---|---|---|---|---|
| diaphragm | ∞ | 0.20 | | |
| 1 | 5.371 | 1.79 | 1.53040 | 56.0 |
| 2 | −1.233 | 0.69 | | |
| 3 | −0.597 | 0.82 | 1.58300 | 30.0 |
| 4 | −0.945 | | | |

TABLE 4

| surface No. | aspherical coefficient |
|---|---|
| 1st surface | K = 1.3906 × E+01<br>A4 = −4.2652 × E−02<br>A6 = −1.8743 × E−01<br>A8 = 4.2613 × E−01<br>A10 = −7.2327 × E−01<br>A12 = 6.9840 × E− 03 |
| 2nd surface | K = −1.5797 × E−01<br>A4 = 1.7330 × E−02<br>A6 = −1.0029 × E−02<br>A8 = −1.1075 × E−02<br>A10 = 1.4068 × E−02<br>A12 = −3.3512 × E−03 |
| 3rd surface | K = −1.1454<br>A4 = −1.2942 × E−01<br>A6 = 4.9864 × E−02<br>A8 = 3.5928 × E−02<br>A10 = 7.8128 × E−03<br>A12 = −1.3071 × E−02 |
| 4th surface | K = −1.1391<br>A4 = −6.9490 × E−03<br>A6 = 1.2279 × E−02<br>A8 = 5.3040 × E−03<br>A10 = 1.4490 × E−03<br>A12 = −8.0376 × E−04 |

Figure 3:
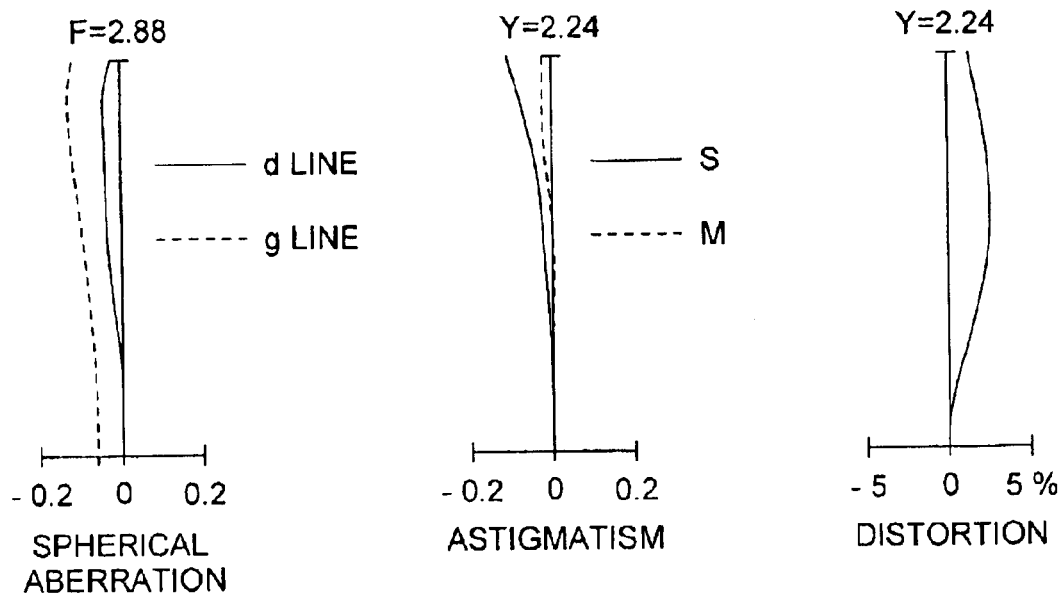
FIG. 3 shows aberrations of a miniature image-capturing lens of Example 2.
Figure 3:
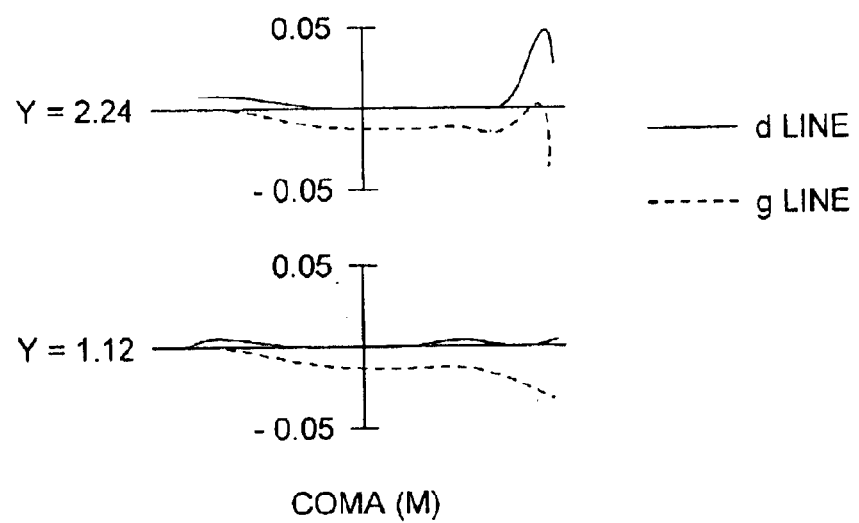

FIG. 3 is a drawing of aberrations (spherical aberration, astigmatism, distortion, and meridional coma) of the miniature image-capturing lens of Example 2. In the present example, the first lens is formed of polyolefine type plastic material, the saturated water-absorption ratio of which is not greater than 0.01%. The second lens is formed of polycarbonate plastic material, and the saturated water-absorption ratio of which is 0.4%.

EXAMPLE 3

Lens data of Example 3 is shown in Tables 5 and 6. In this example, L/2Y equals 1.28.

TABLE 5

(Example 3)
f = 3.570 mm fB = 2.005 mm F = 2.88 2Y = 4.48 mm

| surface No. | R (mm) | D (mm) | Nd | νd |
|---|---|---|---|---|
| diaphragm | ∞ | 0.20 | | |
| 1 | 6.023 | 1.90 | 1.53040 | 56.0 |
| 2 | −1.333 | 0.80 | | |
| 3 | −0.639 | 0.83 | 1.58300 | 30.0 |
| 4 | −1.000 | | | |

TABLE 6

| surface No. | aspherical coefficient |
|---|---|
| 1st surface | K = 1.3914 × E+01<br>A4 = −4.2387 × E−02<br>A6 = −9.6265 × E−02<br>A8 = 2.1630 × E−01<br>A10 = −4.8606 × E−01<br>A12 = 2.7867 × E−01 |
| 2nd surface | K = −1.5172 × E−01<br>A4 = 1.3267 × E−02 |

TABLE 6-continued

| surface No. | aspherical coefficient |
|---|---|
| | A6 = −4.7057 × E−03 |
| | A8 = −4.8870 × E−04 |
| | A10 = 5.4490 × E−03 |
| | A12 = −1.6540 × E−03 |
| 3rd surface | K = −1.1003 |
| | A4 = −8.2518 × E−02 |
| | A6 = 7.2908 × E−02 |
| | A8 = 2.6898 × E−02 |
| | A10 = −1.0680 × E−02 |
| | A12 = −4.6501 × E−03 |
| 4th surface | K = −1.0920 |
| | A4 = 6.6646 × E−05 |
| | A6 = 1.3325 × E−02 |
| | A8 = 4.3334 × E−03 |
| | A10 = 1.0348 × E−03 |
| | A12 = −7.2170 × E−04 |

Figure 4:
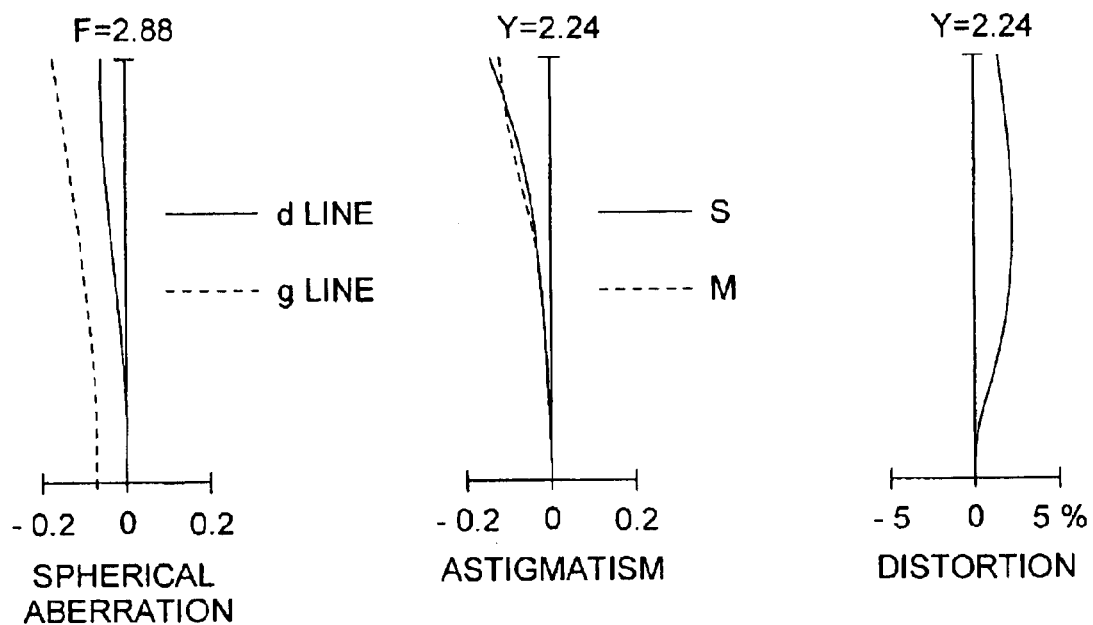
FIG. 4 shows aberrations of a miniature image-capturing lens of Example 3.
Figure 4:
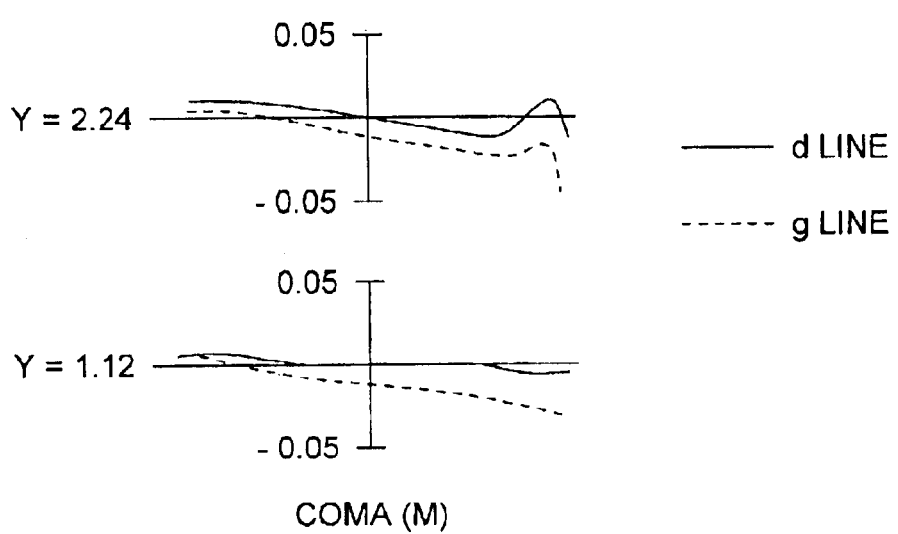

FIG. 4 is a drawing of aberrations (spherical aberration, astigmatism, distortion, and meridional coma) of the miniature image-capturing lens of Example 3. In the present example, the first lens is formed of polyolefine type plastic material, the saturated water-absorption ratio of which is not greater than 0.01%. The second lens is formed of polycarbonate plastic material, and the saturated water-absorption ratio of which is 0.4%.

EXAMPLE 4

Lens data of Example 4 is shown in Tables 7 and 8. In this example, L/2Y equals 1.22.

TABLE 7

(Example 4)
f = 3.270 mm fB = 1.816 mm F = 2.88 2Y = 4.48 mm

| surface No. | R (mm) | D (mm) | Nd | vd |
|---|---|---|---|---|
| diaphragm | ∞ | 0.20 | | |
| 1 | 5.536 | 1.85 | 1.53040 | 56.0 |
| 2 | −1.244 | 0.76 | | |
| 3 | −0.600 | 0.83 | 1.60927 | 26.5 |
| 4 | −0.925 | | | |

TABLE 8

| surface No. | aspherical coefficient |
|---|---|
| 1st surface | K = 1.3914 × E+01 |
| | A4 = −4.3054 × E−02 |
| | A6 = −1.7146 × E−01 |
| | A8 = 4.9875 × E−01 |
| | A10 = −1.0426 × E+00 |
| | A12 = 5.9917 × E−01 |
| 2nd surface | K = −2.3799 × E−01 |
| | A4 = 2.0878 × E−02 |
| | A6 = −4.2744 × E−03 |
| | A8 = −7.0343 × E−03 |
| | A10 = 1.0279 × E−02 |
| | A12 = −3.5563 × E−03 |
| 3rd surface | K = −1.0854 |
| | A4 = −1.0019 × E−01 |
| | A6 = 9.4376 × E−02 |
| | A8 = 3.2749 × E−02 |
| | A10 = −1.8552 × E−02 |
| | A12 = −4.2261 × E−03 |
| 4th surface | K = −1.0548 |
| | A4 = −2.2903 × E−03 |
| | A6 = 1.2737 × E−02 |
| | A8 = 5.5772 × E−03 |

TABLE 8-continued

| surface No. | aspherical coefficient |
|---|---|
| | A10 = 1.9549 × E−03 |
| | A12 = −1.0871 × E−03 |

Figure 5:
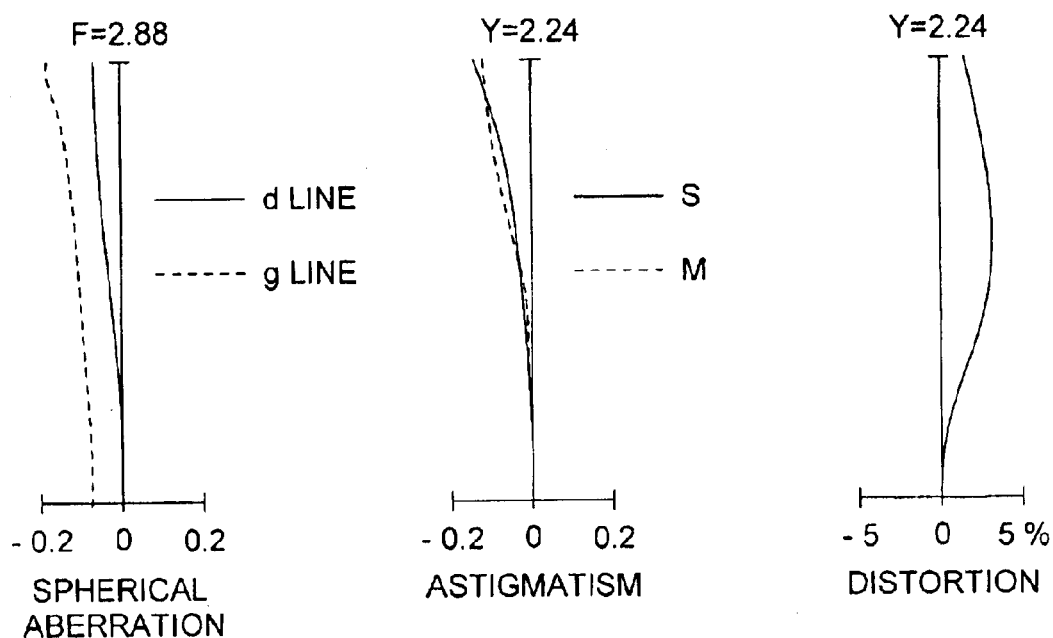
FIG. 5 shows aberrations of a miniature image-capturing lens of Example 4.
Figure 5:
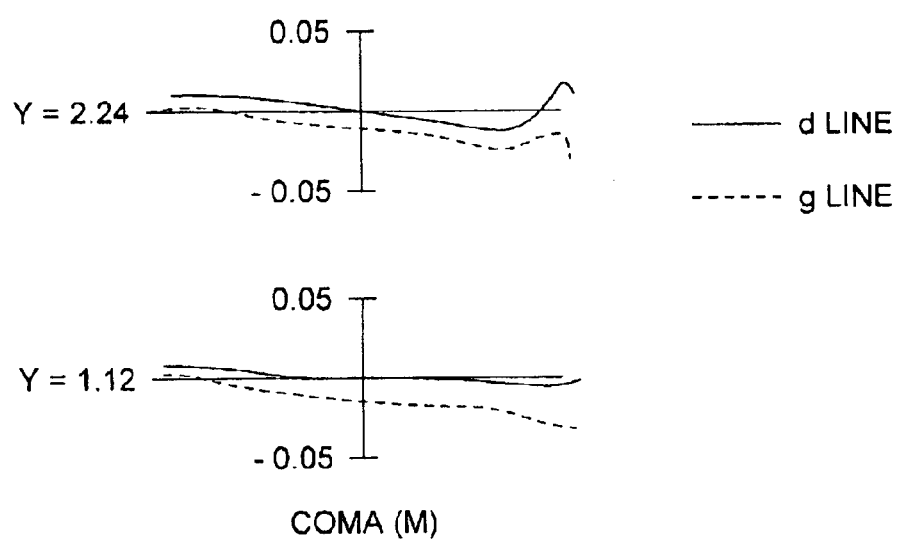

FIG. 5 is a drawing of aberrations (spherical aberration, astigmatism, distortion, and meridional coma) of the miniature image-capturing lens of Example 4. In the present example, the first lens is formed of polyolefine type plastic material, the saturated water-absorption ratio of which is not greater than 0.01%. The second lens is formed of polycarbonate plastic material, and the saturated water-absorption ratio of which is 0.7%.

EXAMPLE 5

Lens data of Example 5 is shown in Tables 9 and 10. In this example, L/2Y equals 1.23.

TABLE 9

(Example 5)
f = 3.330 mm fB = 1.634 mm F = 2.88 2Y = 4.48 mm

| surface No. | R (mm) | D (mm) | Nd | vd |
|---|---|---|---|---|
| diaphragm | ∞ | 0.20 | | |
| 1 | 4.554 | 2.07 | 1.53040 | 56.0 |
| 2 | −1.280 | 0.78 | | |
| 3 | −0.568 | 0.81 | 1.58300 | 30.0 |
| 4 | −0.880 | | | |

TABLE 10

| surface No. | aspherical coefficient |
|---|---|
| 1st surface | K = 1.3914 × E+01 |
| | A4 = −3.8890 × E−02 |
| | A6 = −1.9631 × E−01 |
| | A8 = 6.0047 × E−01 |
| | A10 = −1.1023 × E+00 |
| | A12 = 5.9917 × E−01 |
| 2nd surface | K = −3.0239 × E−01 |
| | A4 = 1.9489 × E−02 |
| | A6 = −6.5352 × E−03 |
| | A8 = −6.8498 × E−03 |
| | A10 = 1.0235 × E−02 |
| | A12 = −3.5563 × E−03 |
| 3rd surface | K = −1.0921 |
| | A4 = −1.0373 × E−01 |
| | A6 = 9.1332 × E−02 |
| | A8 = 3.5744 × E−02 |
| | A10 = −1.6421 × E−02 |
| | A12 = −6.1030 × E−03 |
| 4th surface | K = −1.0891 |
| | A4 = −1.8896 × E−03 |
| | A6 = 1.3733 × E−02 |
| | A8 = 5.5698 × E−03 |
| | A10 = 1.8721 × E−03 |
| | A12 = −1.0850 × E−03 |

Figure 6:
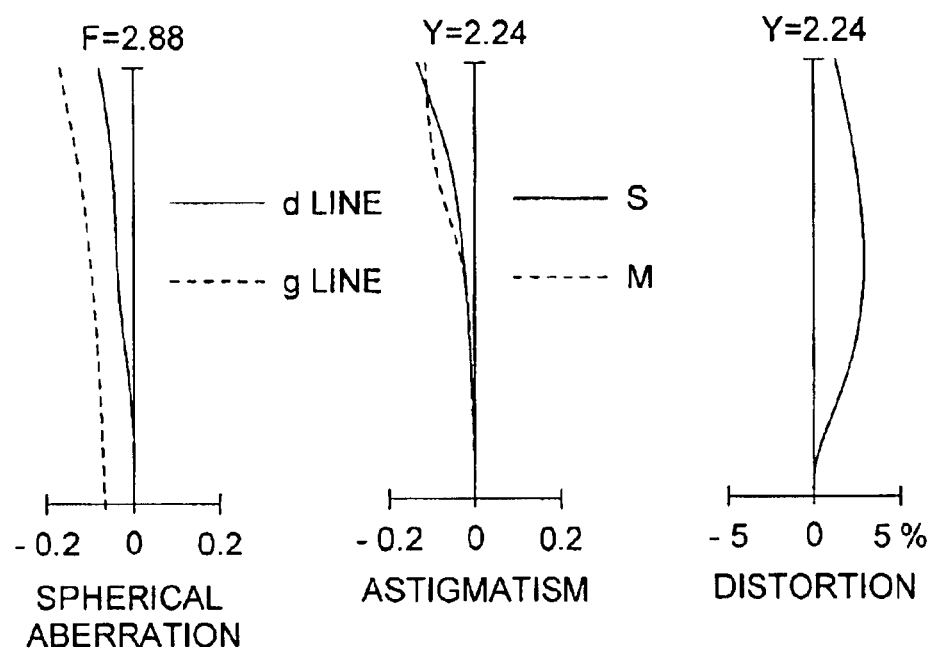
FIG. 6 shows aberrations of a miniature image-capturing lens of Example 5.
Figure 6:
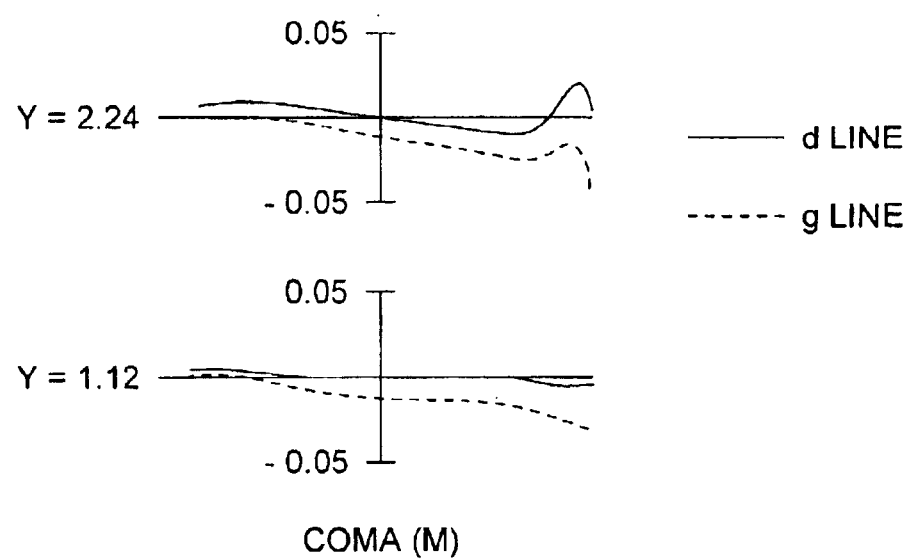

FIG. 6 is a drawing of aberrations (spherical aberration, astigmatism, distortion, and meridional coma) of the miniature image-capturing lens of Example 5. In the present example, the first lens is formed of polyolefine type plastic material, the saturated water-absorption ratio of which is not greater than 0.01%. The second lens is formed of polycarbonate plastic material, and the saturated water-absorption ratio of which is 0.4%.

EXAMPLE 6

Lens data of Example 6 is shown in Tables 11 and 12. In this example, L/2Y equals 1.25.

TABLE 11

(Example 6)
f = 3.330 mm fB = 1.666 mm F = 2.88 2Y = 4.48 mm

| surface No. | R (mm) | D (mm) | Nd | vd |
|---|---|---|---|---|
| diaphragm | ∞ | 0.20 | | |
| 1 | 9.806 | 1.80 | 1.53040 | 56.0 |
| 2 | −1.182 | 0.92 | | |
| 3 | −0.613 | 1.00 | 1.58300 | 30.0 |
| 4 | −0.968 | | | |

TABLE 12

| surface No. | aspherical coefficient |
|---|---|
| 1st surface | K = 1.3914 × E+01<br>A4 = −6.0485 × E−02<br>A6 = −1.0336 × E−01<br>A8 = 2.6827 × E−01<br>A10 = −8.3648 × E−01<br>A12 = 5.9917 × E−01 |
| 2nd surface | K = −5.2513 × E−01<br>A4 = 2.0091 × E−02<br>A6 = −1.3309 × E−02<br>A8 = −4.8690 × E−03<br>A10 = 4.9837 × E−03<br>A12 = −3.5563 × E−03 |
| 3rd surface | K = −1.3516<br>A4 = −6.1945 × E−02<br>A6 = 5.6812 × E−02<br>A8 = −7.0749 × E−03<br>A10 = −1.1183 × E−02<br>A12 = 5.1813 × E−03 |
| 4th surface | K = −1.4172<br>A4 = 5.4130 × E−03<br>A6 = 8.6734 × E−03<br>A8 = 1.0147 × E−03<br>A10 = −6.5257 × E−04<br>A12 = 8.5776 × E−05 |

Figure 7:
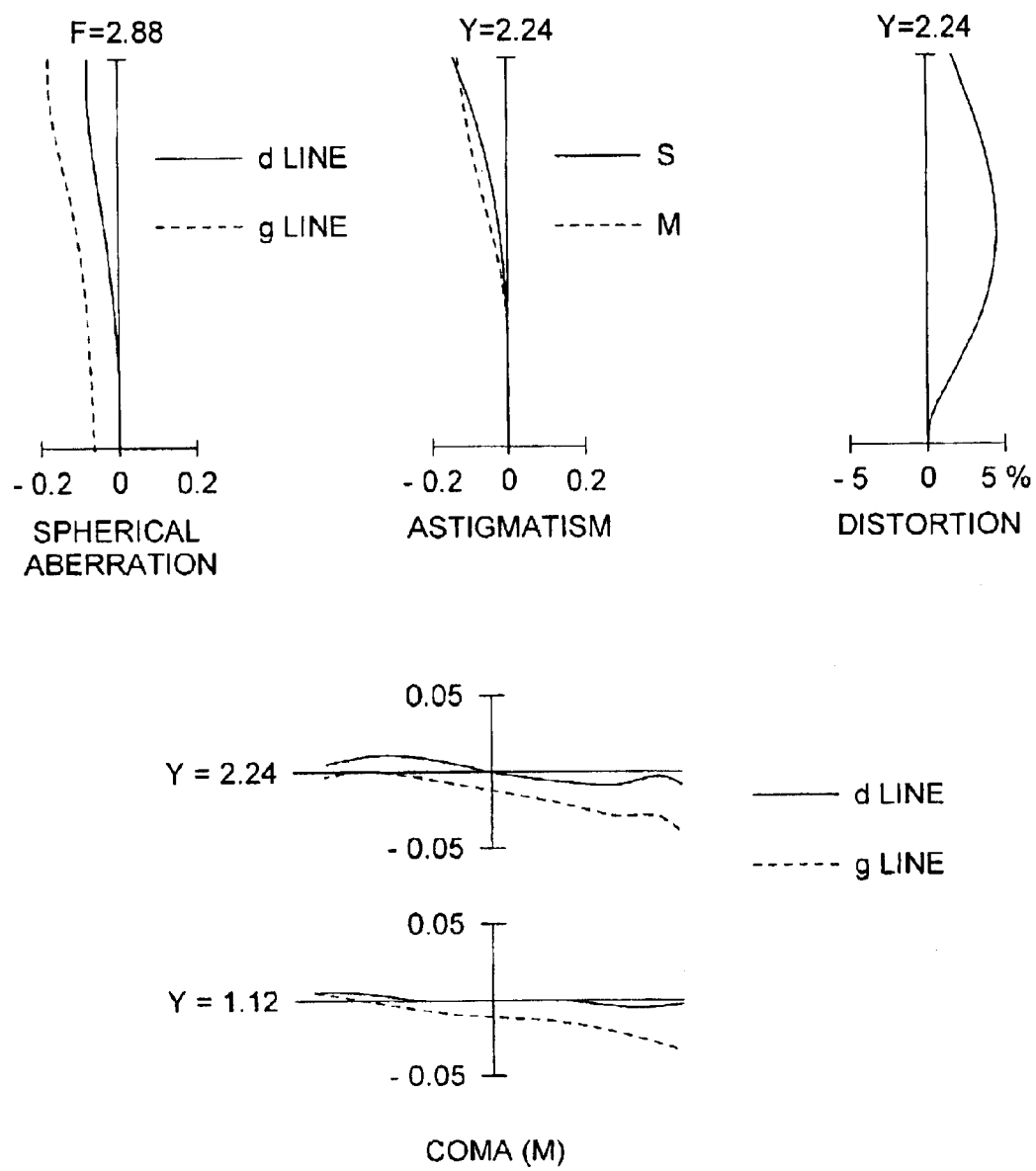
FIG. 7 shows aberrations of a miniature image-capturing lens of Example 6.

FIG. 7 is a drawing of aberrations (spherical aberration, astigmatism, distortion, and meridional coma) of the miniature image-capturing lens of the miniature image-capturing lens of Example 6. In the present example, the first lens is formed of polyolefine type plastic material, the saturated water-absorption ratio of which is not greater than 0.01%. The second lens is formed of polycarbonate plastic material, and the saturated water-absorption ratio of which is 0.4%.

EXAMPLE 7

Tables 13 and 14 show lens data of Example 7. In this example, L/2Y equals 1.34 (L/2Y=1.34).

Figure 8:
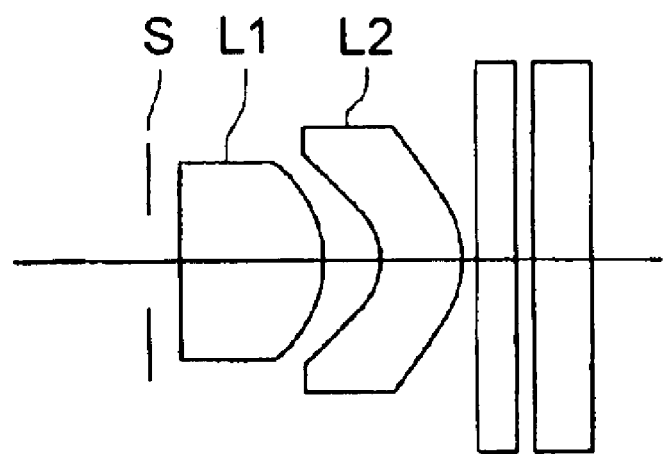
FIG. 8 is a cross section of a miniature image-capturing lens of Example 7 of the present invention.

FIG. 8 is a cross section of the miniature image-capturing lens of Example 7 of the present invention, in which L1 is the first lens, L2 is the second lens, and S is an aperture diaphragm.

TABLE 13

(Example 7)
f = 2.003 mm fB = 0.540 mm F = 2.88 2Y = 2.64 mm

| surface No. | R (mm) | D (mm) | Nd | vd |
|---|---|---|---|---|
| diaphragm | ∞ | 0.20 | | |
| 1 | 4.327 | 1.10 | 1.53175 | 56.6 |
| 2 | −0.657 | 0.38 | | |
| 3 | −0.351 | 0.60 | 1.58300 | 30.0 |
| 4 | −0.599 | 0.10 | | |
| 5 | ∞ | 0.30 | 1.51633 | 64.1 |
| 6 | ∞ | 0.15 | | |
| 7 | ∞ | 0.40 | 1.51633 | 64.1 |
| 8 | ∞ | | | |

TABLE 14

| surface No. | aspherical coefficient |
|---|---|
| 1st surface | K = −9.99990 × E+01<br>A4 = −9.64915 × E−02<br>A6 = −1.52435 × E+00<br>A8 = 1.10733 × E+01<br>A10 = −4.79801 × E+01 |
| 2nd surface | K = −3.73112 × E−01<br>A4 = 3.72983 × E−01<br>A6 = −3.21133 × E−02<br>A8 = −3.49840 × E−01<br>A10 = 4.93414 × E−01 |
| 3rd surface | K = −1.02060 × E+00<br>A4 = 7.80649 × E−01<br>A6 = 1.46099 × E+00<br>A8 = −7.25744 × E+00<br>A10 = 1.11634 × E+01<br>A12 = −6.78674 × E+00 |
| 4th surface | K = −1.06921 × E+00<br>A4 = 1.66446 × E−01<br>A6 = 2.51030 × E−01<br>A8 = 1.88264 × E−01<br>A10 = −9.49449 × E−01<br>A12 = 9.14656 × E−01<br>A14 = −2.97099 × E−01 |

Figure 9:
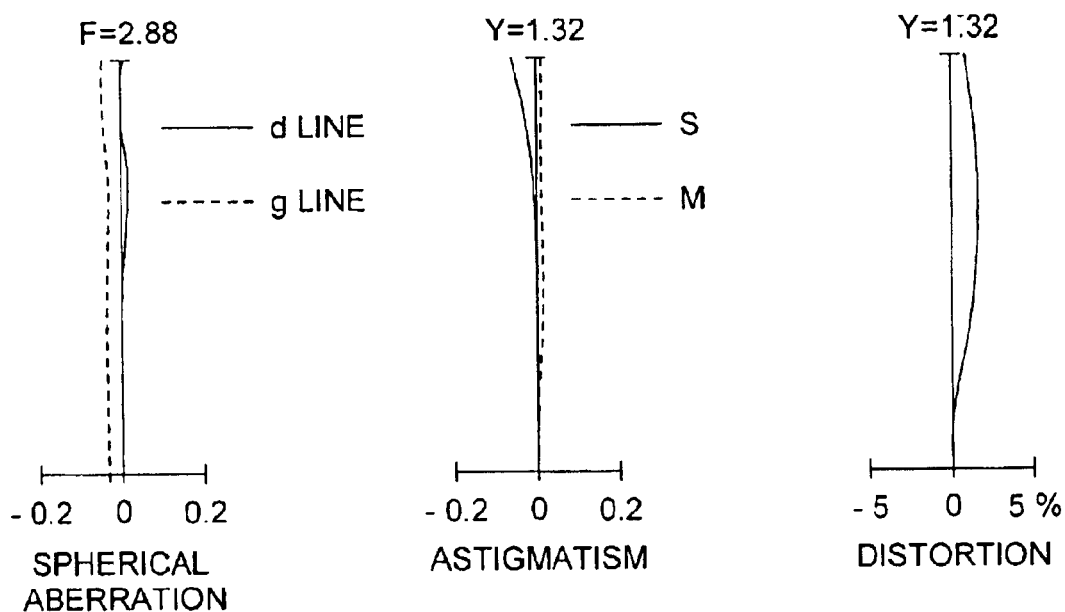
FIG. 9 shows aberrations of a miniature image-capturing lens of Example 7.
Figure 9:
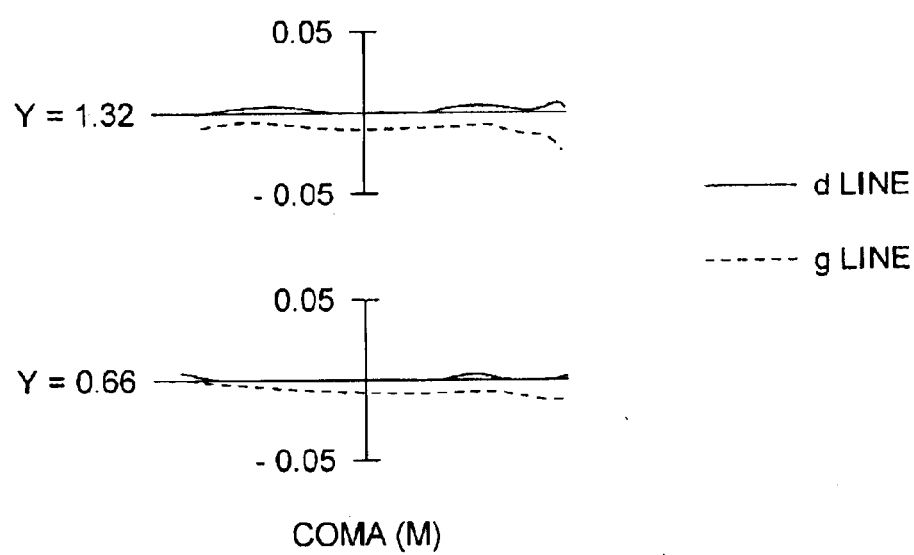

FIG. 9 is a drawing of aberrations (spherical aberration, astigmatism aberration, distortion aberration, and meridional coma aberration) of the miniature image-capturing lens of Example 7. In the present example, the first lens is formed of polyolefine type plastic material, and the saturated water-absorption ratio is 0.01% or less. The second lens is formed of polycarbonate type plastic material, and the saturated water-absorption ratio is 0.4%.

Incidentally, the present example is a design example in which at the position closest to the image side, there are provided parallel flat plates corresponding to an infrared ray cut filter and a seal glass for a solid-state image capturing element.

Table 15 shows the values of each example corresponding to each formula.

TABLE 15

| | Ex. 1 | Ex. 2 | Ex. 3 | Ex. 4 | Ex. 5 | Ex. 6 | Ex. 7 |
|---|---|---|---|---|---|---|---|
| (1) f1/f | 0.63 | 0.63 | 0.63 | 0.65 | 0.64 | 0.63 | 0.58 |
| (2) (R2 + R1)/(R1 − R2) | 0.63 | 0.63 | 0.64 | 0.63 | 0.56 | 0.78 | 0.74 |
| (3) R3/((N2−1) · f) | −0.31 | −0.31 | −0.31 | −0.30 | −0.29 | −0.32 | −0.30 |
| (4) v1−v2 | 26 | 26 | 26 | 29.5 | 26 | 26 | 26 |

Ex.: Example

In the above-mentioned examples, the telecentric characteristics of the image side light rays are not always sufficient in design. The telecentric characteristics means that when the main light beam of the light flux to each image point passes through the last surface of the lens, the main light beam is nearly parallel to the optical axis. In other words, it means that the position of the exit pupil of the optical system is sufficiently far from the image surface. When the telecentric characteristics is inadequate, the light rays enter the solid-state image-capturing element at a slant, a shading phenomenon occurs in which the effective aperture efficiency is reduced on the peripheral area of the picture surface, which causes a reduction of the amount of light rays at the periphery. However, the arrangement of the color filter and micro lens array of the solid state image-capturing element are improved by recent technology, and whereby the above-mentioned shading phenomenon can be reduced. Accordingly, the requirement of the telecentric characteristics is relieved allowing the design aiming at the smaller size as shown in the present example.

Figure 10:
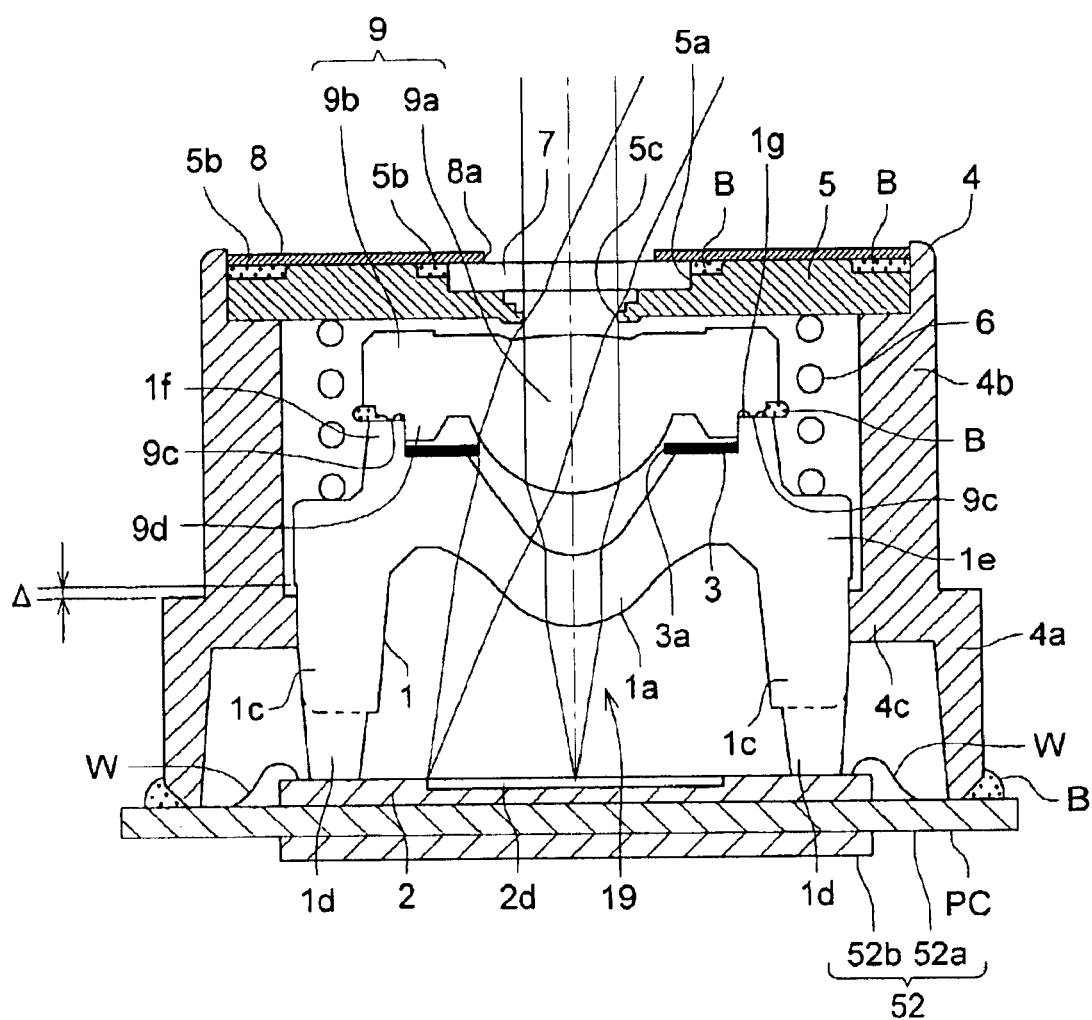
FIG. 10 is a cross section showing the present embodiment of the imaging device featuring a miniature image-capturing lens of the above-mentioned examples.
Figure 11:
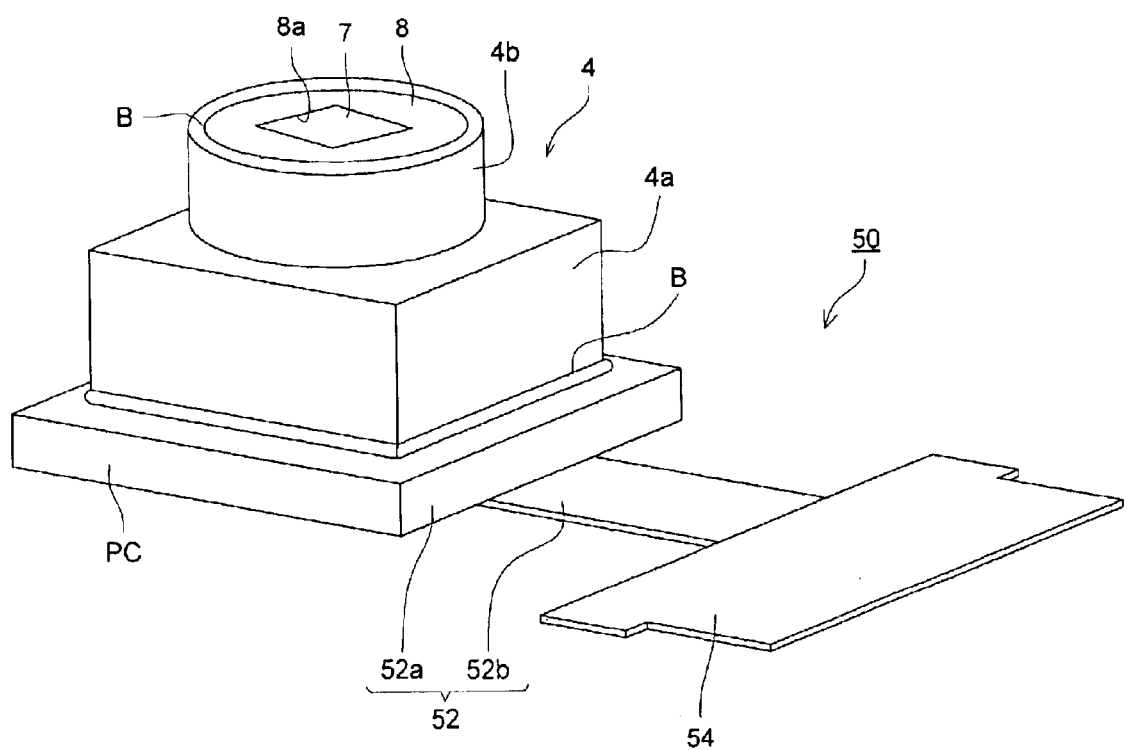
FIG. 11 is a perspective view of the imaging device of the present embodiment.
Figure 12:
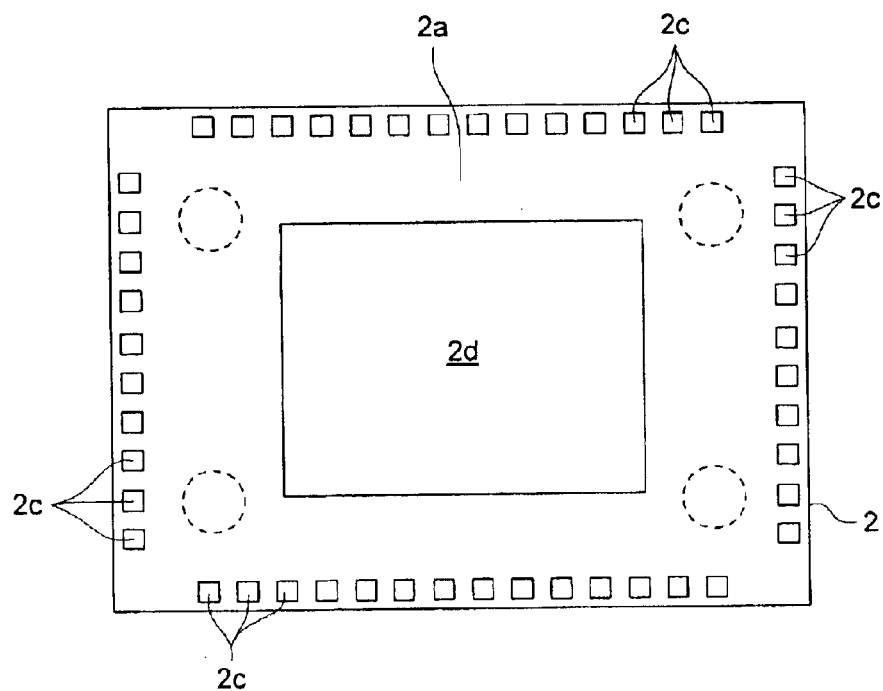
FIG. 12 is a top view of a solid-state image-capturing element which is used for the imaging device of the present embodiment.
Figure 13:
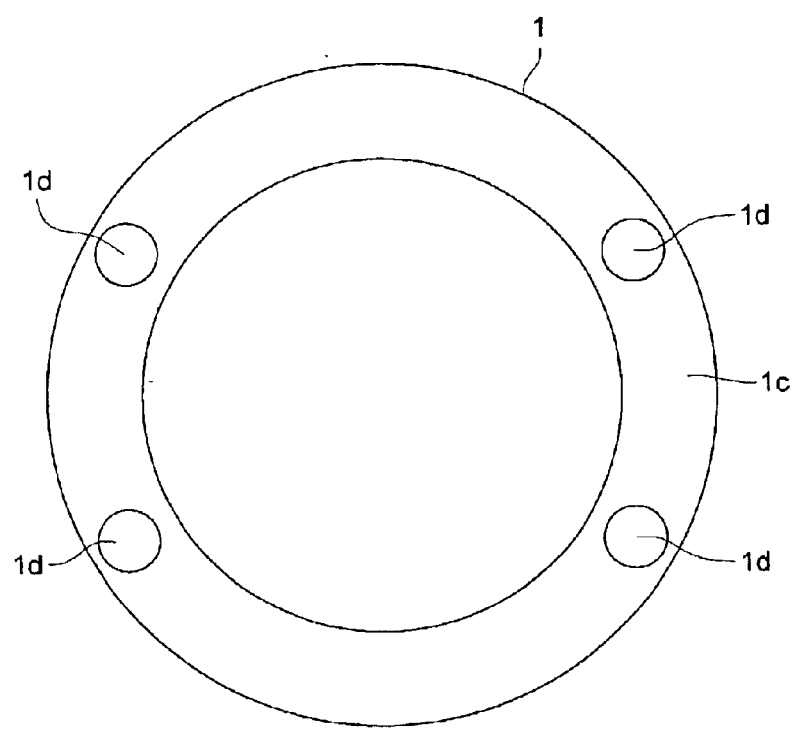
FIG. 13 is a bottom view of the miniature image-capturing lens of the present embodiment.

FIG. 10 is a cross section showing the embodiment of the imaging unit featuring the miniature image-capturing lens of the above-mentioned example. FIG. 11 is a perspective view of the imaging unit. FIG. 12 is a top view of a solid-state image-capturing element which is used in the imaging unit. FIG. 13 is a bottom view of the same miniature image-capturing lens.

In FIG. 10, optical member 19 is composed of image side lens member 1 and object side lens member 9, both of which are made of a plastic material. As shown in FIG. 10, image side lens member 1 is integrally unitized by leg section 1c which is shaped like a hollow cylinder, four pieces of touching sections 1d act as part of legs 1c, all four of which are formed at the lower ends of legs 1c, step section 1e is formed around the top end of leg 1c, lens section 1a (corresponding to L2 in FIG. 1), and ring section 1f are formed around the top end of image side lens member 1. As shown in FIG. 13, touching section 1d of image side lens member 1 has four pieces of tapering columns projecting from the lower surfaces of legs 1c, which are shaped like hollow cylinders.

Further, in FIG. 10, arranged on lens section 1a is light shading mask 3, made of a light-shading material, and having opening 3a as a aperture diaphragm which controls the entry of peripheral light rays.

Object side lens member 9 is arranged to fit into an inner circumferential plane of ring section 1f, and to touch to touching surface 1g which is the top surface of ring section 1f.

Object side lens member 9 is composed of flange section 9b on ring section 1f, positive lens section 9a (corresponding to L1 in FIG. 1) which is formed in the center, projection 9c, to be explained later, and ring section 9d to interfit with ring section 1f.

On the lower surface of flange section 9b of object side lens member 9, tapering projections 9c, formed on three points at the same intervals, is formed to face touching section 1g (not less than three points are preferable).

After light-shading mask 3 is fitted into image side lens member 1, adhesive B is coated on touching surface 1g, and object side lens member 9 is pressed down from the upper side, then, projection 9c touches touching surface 1g, and excessive adhesive B is forced out around projection 9c, and these elements are fixed into the position.

If there were no projection 9c, image side lens member 1 and object side lens member 9 would be in full surface engagement, in that case adhesive B would exist between touching sections, and problem would occur in that the clearance between image side member 1 and object side lens member 9 would not be adequate. However, according to the present embodiment, it is possible to have projection 9c touch touching surface 1g exactly, even though there is adhesive B. Accordingly, by establishing an appropriate height of projection 9c, the clearance between image side lens member 1 and object side lens member 9 is determined precisely, and thereby, it is possible during mass production to control unevenness of focusing position and various kinds of aberration in the total lens system.

Further, light-shading mask 3 in the present embodiment does not touch object side lens member 9c, and works only as a aperture diaphragm to control peripheral light rays. However, by having light-shading mask 3 touch object side lens member 9, it is possible to make it act as a spacer to control clearance between lenses 1a and 9a, instead of projection 9c.

Concerning inner circumferential plane of ring section 1f of image side lens member 1, and outer circumferential plane of ring section 9d projecting downward from flange section 9b, their diameters are the same and parallel to the light axis. By engaging these planes with each other, it is possible to determine the positions, being perpendicular to the optical axis, of lens members 1a and 9a, and their optical axes are easily unitized.

On the outside of optical member 19, arranged is lens holder 4 made of a light-shielding material. As understood by FIG. 11, lens holder 4 is provided with lower section 4a which is prismatic and upper section 4b which is cylindrical. A lower end of lower section 4a touches base board PC, and is fixed by adhesive B. In FIG. 10, the upper surface of lower section 4a is covered by barrier wall 4c, and leg 1c of optical member 19 is engaged with the circular inner circumferential plane of barrier wall 4c. Therefore, base board PC and lens holder 4 can be arranged so that the center of circular opening of barrier wall 4c and the center of photoelectric conversion section 2d of after-mentioned image-capturing element 2 are unitized, by an optical sensor of the automatic assembling machine. After that, optical member 19 is inserted from the top, and then, lens section 1a and positive lens section 9a can be accurately positioned with photoelectric conversion section 2d of after-mentioned image-capturing element 2, being perpendicular to the optical axis.

On the top end of top section 4b of lens holder 4, there are central engaging section 5a, adhesive section 5b whose inner circumferential side and outer circumferential side are lower than its upper surface, and diameter decreasing section 5c, which projects toward a lower section of engaging section 5a, and whose diameters decrease in series of steps, and there is attached holding member 5 serving a light-shielding function. Diameter stepped decreasing section 5c is a diaphragm (corresponding to S in FIG. 1) for controlling the F number of the total image-capturing lens system. Filter 7, formed by infrared absorbing material, is mounted on engaging section 5a. After adequate adhesive B is applied onto adhesive section 5b of holding member 5, thin light-shielding sheet 8 is mounted, then, filter 7, light-shielding sheet 8, and holding member 5 can be attached to lens holder 4 simultaneously.

In FIG. 10, resilient means 6 representing a coil spring is arranged between holding member 5 and step section 1e of optical member 19. When holding member 5 is mounted onto lens holder 4, resilient means 6 is elastically deformed, and optical member 19 is forced down by the resilient power. Though the power from holding member is transferred to base board PC through lens holder 4, it is not transferred directly to image-capturing element 2, which is a preferable feature for the protection of image-capturing element 2. Resilience can be adequately controlled by the choice of the wire diameter and the number of turns of the coils of the spring.

In FIG. 12, image-capturing element 2 is represented by a CMOS type image sensor. The bottom surface of thin and rectangular plate-shaped image-capturing element 2 is mounted on the top surface of base board PC. At the center of the top surface of image-capturing element 2, photoelectric conversion section 2d is formed on which the solid-state image-capturing elements are aligned two-dimensionally, and peripheral area 2a, featuring a signal processing circuit on the inside of image-capturing element 2, is formed around photoelectric conversion section 2d. A large number of pads 2c are arranged in the vicinity of the outer edges of peripheral area 2a which crosses at right angles to the thin side surfaces. Pads 2c, representing connecting terminals, are connected to base board PC through wires W as shown in FIG. 10. Image-capturing element 2 converts electrical signals from photoelectric converging section 2d to image signals, and these signals can be outputted to the predetermined circuits of base board PC through pads 2c and wires W.

Further, as shown in FIG. 13, touching section 1d of optical member 19 is projected in the form of a tapering cylinder, from the lower end of leg 1c, and is formed as a part of leg 1c. In the present embodiment, as shown by dotted lines in FIG. 12, in peripheral area 2a of image-capturing element 2, optical member 19 is arranged in such a condition that only touching element 1d touches pads 2c. On the reverse (lower side in FIG. 10) of peripheral area 2a, though a signal processing circuit, not illustrated, of the solid-state image-capturing element is provided, the process of signals is not influenced adversely, because of the touching of touching section 1d.

According to the present embodiment, under the condition that touching section 1d touches peripheral area 2a of image-capturing element 2, clearance Δ is formed between the lower surface of step section 1e of optical member 19 and barrier wall 4c of lower section 4a of lens holder 4, and therefore, the distance (that is, positional determination in the direction of the optical axis) between lens section 1a and photoelectric conversion section 2d of image-capturing element 2 is accurately established by the length of leg 1c. Accordingly, by controlling measurement accuracy of leg 1c, there is no need to adjust the focal point of the total image-capturing lens system.

Further, since optical member 19 is composed of a plastic material, it is possible during temperature change to reduce deviation of the focal point based on change of refractive index of lens sections 1a and 9a. That is, the higher the temperature rises, the more the refractive index of the lens falls, and the focal point of the total image-capturing lens system changes in direction away from the lens, and the higher the temperature rises, the longer leg section 1c becomes, therefore, when temperature changes, any deviation of the focal point is effectively controlled. Further, since optical member 19 of the present embodiment is made of a plastic material whose specific gravity is relatively low, it is lighter in weight than a glass lens of the same volume, and further, it is superior in collapsible characteristics, and thereby, image-capturing element 2 is controlled as possible to be damaged, even when the imaging device is accidentally dropped, which is a pleasure for advantage.

In the present embodiment, lens holder 4 is adhered onto base board PC, and including another two adhesive sections, which effectively seal it from entry of foreign matters, therefore, adverse influence to photoelectric conversion section 2d of image-capturing element 2 by such foreign matters can be prevented. The adhesive used for this sealing should be moisture proof so that deterioration of the solid-state image-capturing element and the pad surfaces caused by humidity can be prevented.

The base board 52 is composed of supporting flat plate 52a that supports, on its flat surface, the image sensor 2 and casing 4, and of flexible base board 52b whose end portion is connected to the rear side (the surface opposite to the image sensor 2) of the supporting flat plate 52a.

The supporting flat plate 52a has a number of signal transmission pads provided on its surface and its rear side, and it is connected to wire W of the image sensor 2 on its flat surface side and is connected to the flexible base board 52b on its rear surface side.

The flexible base board 52b is connected, at its one end portion, with the supporting flat plate 52a, and connects the supporting flat plate 52a with an outer circuit (for example, a control circuit that is owned by a superordinate apparatus housing therein an image-capturing unit) through outer output terminal 54 provided on the other end, then, accepts from the outer circuit the supply of voltage and clock signals for driving the image sensor 2, and makes it possible to output digital YUV signals to the output circuit. Further, an intermediate portion of the flexible base board 52b in the longitudinal direction is provided with flexibility or deformability, and its deformability gives the degree of freedom to a direction or arrangement of an outer output terminal for the supporting flat plate 52a.

Figure 15:
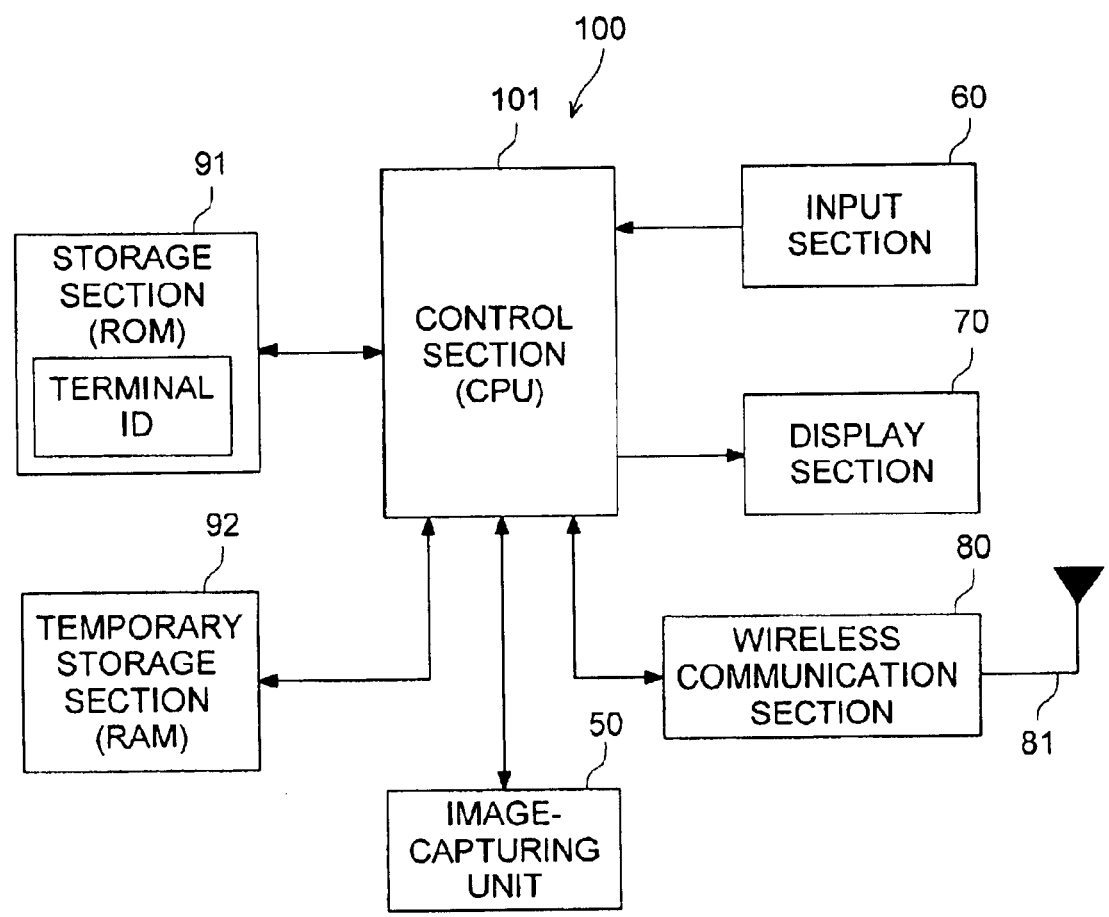
FIG. 15 is a block diagram.

An embodiment to use the image-capturing unit 50 will be explained as follows. FIG. 14 shows how the image-capturing unit 50 is mounted on cell-phone 100 representing a mobile terminal. FIG. 15 is a control block diagram of the cell-phone 100.

For example, the image-capturing unit 50 is provided at the position below the liquid crystal display section, with an end surface of casing 53 on the object side in the image-capturing optical system being provided on the back (a front side is on the liquid crystal display side) of the cell-phone 100.

Outer connection terminal 54 of the image-capturing unit 50 is connected to control section 101 of the cell-phone 100, and outputs image signals such as luminance signals and color difference signals to the control section 101 side.

On the other hand, as shown in FIG. 15, the cell-phone 100 is composed of control section (CPU) 101 that controls each section collectively and conducts a program corresponding to each processing, input section 60 for support-inputting the numbers by means of a key, display section 70 that displays images captured in addition to prescribed data, wireless communication section 80 for realizing each type of information communication with outer servers, storage section (ROM) 91 storing system programs of cell-phone 100, various types of processing programs and necessary data such as terminal ID and temporary storage section (RAM) 92 used as a work area storing temporarily various types of processing programs, data, or processing data or image-capturing data by image-capturing unit 50 executed by control section 101.

Then, image signals inputted from the image-capturing unit 50 are stored in storage section 92 by the control system of the cell-phone 100, or displayed on the display section 70, or further, transmitted to the outside through wireless communication section 80 as image information.

As mentioned above, the present invention has been explained referring to embodiments, but the invention should not be interpreted to be limited to the above-mentioned embodiment, and needless to say, it is possible to appropriately modify and to improve the embodiment. For example, the miniature image-capturing lens of the present embodiment is designed so that a low pass filter or an infrared cutting filter is not arranged between the lens and the photoelectric conversion section of the solid state image-capturing element, however, such filters and the like can be so arranged, if necessary. According to the above-mentioned invention, in spite of the simple composition featuring only two lens elements, it is possible to provide a miniature image-capturing lens which is small and is optimally corrected for aberration.

What is claimed is:

1. A miniature image capturing lens to capture an image of an object, comprising:

an aperture diaphragm having an aperture through which an image is captured; and a lens system consisting of
a first lens having a positive refracting power in which a convex surface of the first lens is directed toward the image; and
a meniscus-shaped second lens in which a concave surface of the meniscus is directed toward the object;

wherein the aperture diaphragm, the first lens and the second lens are aligned in this order from the object side, the fist and second lenses have at least one aspherical surface and the following conditional formulas are satisfied:

$$0.50 < f1/f < 0.80$$

$$0.30 < (R2+R1)/(R1-R2) < 1.20$$

where f1 is a focal length of the first lens, f is a focal length of the entire image capturing lens, R1 is a radius of curvature of the object side surface of the first lens, and R2 is a radius of curvature of the image side surface of the second lens.

2. The miniature image capturing lens of claim 1, wherein the following conditional formula is satisfied:

$$-0.50 < R3/((N2-1) \cdot f) < -0.10$$

where R3 is a radius of curvature of the object side surface of the second lens, and N2 is a refractive index of the second lens for d-line.

3. The miniature image capturing lens of claim 1, wherein the following conditional formula:

$$25.0 < v1-v2$$

where v1 is Abbe constant of the first lens, and v2 is Abbe constant of the second lens.

4. The miniature image capturing lens of claim 1, wherein the first lens and the second lens are made of a plastic material respectively.

5. The miniature image capturing lens of claim 4, wherein the first lens and the second lens are made of a plastic material having a saturated water absorption rate of 0.7% or less respectively.

6. An image capturing unit comprising:

a solid-state image capturing element provided with a photo-electrically converting section;

the image capturing lens described in claims 1 to 5 and to form an image of an object on the photo-electrically converting section of the solid-state image capturing element;

a base board to support the solid-state image capturing element and having a terminal for an external connection to transmit and receive electric signals; and a casing made of light shielding member and having an opening section for incident light coming from the object, wherein the solid-state image capturing element, the image capturing lens, the base board and the casing are constructed in a single body and the height of the image capturing unit in the direction of an optical axis of the image capturing lens is 10 mm or less.

7. A mobile terminal, comprising:

the image capturing unit described in claim 6.

* * * * *